(12) United States Patent
Muijzert et al.

(10) Patent No.: US 10,191,170 B2
(45) Date of Patent: Jan. 29, 2019

(54) SEISMIC DATA ACQUISITION USING WATER VEHICLES

(71) Applicant: WESTERNGECO L.L.C., Houston, TX (US)

(72) Inventors: Everhard Muijzert, Girton (GB); Kenneth E. Welker, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 519 days.

(21) Appl. No.: 13/748,236

(22) Filed: Jan. 23, 2013

(65) Prior Publication Data

US 2014/0204708 A1    Jul. 24, 2014

(51) Int. Cl.
*G01V 1/38* (2006.01)
*G01V 1/20* (2006.01)

(52) U.S. Cl.
CPC ...... *G01V 1/3817* (2013.01); *G01V 2001/207* (2013.01)

(58) Field of Classification Search
USPC .......................................................... 367/18
See application file for complete search history.

(56) References Cited

U.S. PATENT DOCUMENTS

| 4,694,435 | A | | 9/1987 | Magneville |
| 4,745,583 | A | | 5/1988 | Motal |
| 5,224,105 | A | * | 6/1993 | Higley ........................... 714/748 |
| 5,894,450 | A | * | 4/1999 | Schmidt et al. .............. 367/134 |
| 6,028,817 | A | | 2/2000 | Ambs |
| 6,533,627 | B1 | | 3/2003 | Ambs |
| 6,691,038 | B2 | | 2/2004 | Zajac |
| 6,691,636 | B2 | * | 2/2004 | King ............................ 114/331 |
| 7,371,136 | B2 | | 5/2008 | Hine et al. |
| 7,400,552 | B2 | | 7/2008 | Moldoveanu et al. |
| 7,450,467 | B2 | | 11/2008 | Tveide et al. |
| 7,957,220 | B2 | | 6/2011 | Howlid et al. |
| 8,021,080 | B2 | | 9/2011 | Frivik et al. |

(Continued)

FOREIGN PATENT DOCUMENTS

| EP | 0939910 B1 | 7/2000 |
| WO | 03027712 A2 | 4/2003 |

(Continued)

OTHER PUBLICATIONS

International Search Report and Written Opinion issued in PCT/US2014/012658 dated May 1, 2014, 15 pages.

(Continued)

*Primary Examiner* — James R Hulka
(74) *Attorney, Agent, or Firm* — Kevin Brayton McGoff (57) ABSTRACT

A seismic acquisition system. The seismic acquisition system may include at least one unmanned water vehicle. The seismic acquisition system may also include at least one seismic streamer coupled to the at least one unmanned water vehicle, where the at least one seismic streamer has one or more seismic sensors coupled thereto for recording seismic data in a survey area. The seismic acquisition system may further include a buoyancy compensation mechanism coupled to the at least one seismic streamer, where the buoyancy compensation mechanism is configured to orient the at least one seismic streamer between a generally vertical direction and a generally horizontal direction through a water column.

14 Claims, 10 Drawing Sheets

(56) References Cited

U.S. PATENT DOCUMENTS

| | | | |
|---|---|---|---|
| 8,060,314 B2 | 11/2011 | Welker | |
| 8,104,346 B2 | 1/2012 | Paulson | |
| 2003/0164134 A1* | 9/2003 | King | 114/245 |
| 2004/0013036 A1 | 1/2004 | Fageras et al. | |
| 2009/0316524 A1* | 12/2009 | Tenghamn | 367/16 |
| 2011/0205839 A1* | 8/2011 | Sudow et al. | 367/20 |
| 2011/0266086 A1 | 11/2011 | Welker et al. | |
| 2013/0329519 A1* | 12/2013 | Brizard et al. | 367/18 |
| 2014/0056100 A1* | 2/2014 | Brizard | 367/18 |
| 2014/0160885 A1* | 6/2014 | Tenghamn | 367/16 |
| 2014/0160886 A1* | 6/2014 | Muyzert et al. | 367/16 |

FOREIGN PATENT DOCUMENTS

| | | | | |
|---|---|---|---|---|
| WO | WO 2010076646 A1 * | 7/2010 | | G01V 1/38 |
| WO | 2012110096 A1 | 8/2012 | | |

OTHER PUBLICATIONS

Anonymous, "Underwater Glider," Wikipedia, Nov. 2012: pp. 1-4, <http://en.wikipedia.org/wiki/Underwater_glider>.

Davis et al., "Chapter 3: Autonomous buoyancy-driven underwater gliders." The Technology and Applications of Autonomous Underwater Vehicles, ed.: Griffiths, CRC Press, 2002: pp. 37-58.

Krail, "Vertical cable as a subsalt imaging tool," The Leading Edge, Aug. 1994: pp. 885-887.

Rodriguez et al., "Survey design for vertical cable seismic acquisition," CREWS Research Report, 1998, vol. 10: pp. 6-1-6-19.

Tung et al., "Design of an Underwater Glider with Fore and Aft Buoyancy Engines," IEEE Symposium on Underwater Technology and Workshop on Scientific Use of Submarine Cables and Related Technologies, Apr. 2007: pp. 446-450.

* cited by examiner

SEISMIC DATA ACQUISITION USING WATER VEHICLES

BACKGROUND

The following descriptions and examples do not constitute an admission as prior art by virtue of their inclusion within this section.

Seismic exploration involves surveying subterranean geological formations for hydrocarbon deposits. A seismic survey may involve deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy one type of sensors or both. In response to the detected seismic events, the sensors generate electrical signals to produce seismic data. Analysis of the seismic data can then indicate the presence or absence of probable locations of hydrocarbon deposits.

Marine surveys may be performed in various marine environments. In one marine survey, water vehicles, such as autonomously operated vehicles (AOVs) or remotely operated vehicles (ROVs), may be used to gather seismic data from one or more seismic sensors. These seismic sensors may be attached to vertical seismic streamers deployed from the water vehicles, which may allow for more effective removal of ghost signals and measurement of propagation speed when compared with conventional horizontal streamers.

As these water vehicles traverse through the various marine environments, the vertical seismic streamers may create a drag force that inhibits the water vehicles' ability to move. In addition, moving the vertical seismic streamers using the water vehicles may increase cross-flow over the vertical seismic streamers and generate increased background noise during acquisition.

SUMMARY

Described herein are implementations of various technologies for seismic data acquisition using water vehicles. In one implementation, various technologies described herein are directed to a seismic acquisition system that may include at least one unmanned water vehicle. The seismic acquisition system may also include at least one seismic streamer coupled to the at least one unmanned water vehicle, where the at least one seismic streamer has one or more seismic sensors coupled thereto for recording seismic data in a survey area. The seismic acquisition system may further include a buoyancy compensation mechanism coupled to the at least one seismic streamer, where the buoyancy compensation mechanism is configured to orient the at least one seismic streamer between a generally vertical direction and a generally horizontal direction through a water column.

In another implementation, the seismic acquisition system may include at least one unmanned water vehicle. The seismic acquisition system may also include at least one seismic streamer coupled to the at least one unmanned water vehicle, where the at least one seismic streamer has one or more seismic sensors coupled thereto for recording seismic data in a survey area. The seismic acquisition system may further include at least one reel mechanism coupled to the at least one unmanned water vehicle for deploying and storing the at least one seismic streamer.

In a further implementation, the seismic acquisition system may include at least one unmanned water vehicle. The seismic acquisition system may also include at least one seismic streamer coupled to the at least one unmanned water vehicle, where the at least one seismic streamer has one or more seismic sensors coupled thereto for recording seismic data in a survey area. The seismic acquisition system may further include at least one underwater device coupled to the at least one seismic streamer, where the at least one underwater device is configured to orient the at least one seismic streamer between a generally vertical direction and a generally horizontal direction through a water column.

In yet another implementation, the seismic acquisition system may include a first unmanned water vehicle. The seismic acquisition system may also include a second unmanned water vehicle. The seismic acquisition system may further include a seismic streamer having a first portion coupled to the first unmanned water vehicle and having a second portion coupled to the second unmanned water vehicle, where the seismic streamer has one or more seismic sensors coupled thereto for recording seismic data in a survey area, and where the first unmanned water vehicle and the second unmanned water vehicle are configured to orient the seismic streamer between a generally vertical direction and a generally horizontal direction through a water column.

In another implementation, various techniques described herein are directed to a method of performing a seismic survey that may include deploying at least one seismic streamer in a water column, where the at least one seismic streamer is coupled to at least one unmanned water vehicle for recording seismic data in a survey area. The method may also include orienting the at least one seismic streamer between a generally vertical direction and a generally horizontal direction through the water column by using a buoyancy compensation mechanism coupled to the at least one seismic streamer.

In another implementation, the method may include deploying at least one seismic streamer in a water column, where the at least one seismic streamer is coupled to at least one unmanned water vehicle for recording seismic data in a survey area. The method may also include moving the at least one seismic streamer in a generally vertical direction through the water column using at least one reel mechanism coupled to the at least one unmanned water vehicle when the at least one unmanned water vehicle is located in the survey area. The method may further include storing the at least one seismic streamer when the at least one unmanned water vehicle is located outside of the survey area by winding the at least one streamer around the at least one reel mechanism.

In a further implementation, the method may include deploying at least one seismic streamer in a water column, where the at least one seismic streamer is coupled to at least one unmanned water vehicle for recording seismic data in a survey area. The method may also include orienting the at least one seismic streamer between a generally vertical direction and a generally horizontal direction through the water column by using at least one underwater device coupled to the at least one seismic streamer.

In yet another implementation, the method may include deploying a seismic streamer in a water column for recording seismic data in a survey area, where a first end of the seismic streamer is coupled to a first unmanned water vehicle and a second end of the seismic streamer is coupled to a second unmanned water vehicle. The method may also include orienting the seismic streamer between a generally vertical direction and a generally horizontal direction through a water column by adjusting a distance between the first unmanned water vehicle and the second unmanned water vehicle.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are, both, objects or steps, respectively, but they are not to be considered the same object or step.

The following paragraphs provide a brief summary of various technologies and techniques directed at seismic data acquisition using water vehicles described herein.

In one implementation, a water vehicle may be deployed to a survey area, where the water vehicle may maintain a stationary position while recording seismic data via a generally vertical streamer. The water vehicle may also drift with currents through the survey area while recording seismic data via the generally vertical streamer. In the event that the water vehicle may drift to outside of the survey area, the water vehicle may orient the streamer away from the generally vertical direction. For example, the water vehicle may orient the streamer in a generally horizontal direction within the water column using a buoyancy compensation mechanism, an underwater device, or another wave glider. The water vehicle may also orient streamer away from the generally vertical direction by winding the streamer around a reel mechanism.

Once the streamer has been oriented away from the generally vertical direction, the water vehicle may tow the streamer back to the survey area again. After reaching the survey area, the water vehicle may again orient the streamer in the generally vertical direction and record seismic data.

In one implementation, a buoyancy compensation mechanism may adjust its buoyancy to orient the streamer between the generally vertical direction and the generally horizontal direction through the water column. For example, to orient the streamer in the generally horizontal direction, the buoyancy compensation mechanism may increase its buoyancy. On the other hand, to orient the streamer in the generally vertical direction, the buoyancy compensation mechanism may decrease its buoyancy. The buoyancy compensation mechanism may include a gas container and a buoyancy bag coupled to the gas container via a valve connection.

In another implementation, a reel mechanism may be used to deploy and store the streamer. With the water vehicle operating within the survey area, the reel mechanism may deploy the streamer such that the streamer may be oriented in the generally vertical direction through the water column. Further, in the event that the water vehicle is located outside of the survey area, the reel mechanism may store the streamer by winding the streamer around the reel mechanism.

In yet another implementation, an underwater device may be configured to maneuver vertically within a water column such that it may orient the streamer between the generally vertical direction and the generally horizontal direction through the water column. The underwater device may use its power to descend vertically in the water column, thus orienting the streamer into the generally vertical direction.

Further, the underwater device may use its power to ascend vertically in the water column, thus orienting the streamer into the generally horizontal direction. In one implementation, the underwater device may take the form of an autonomous underwater vehicle (AUV) such as an underwater glider.

In another implementation, a first water vehicle and a second water vehicle may be used to orient the streamer between the generally vertical direction and the generally horizontal direction through the water column. The first water vehicle and the second water vehicle may be positioned at a first distance from each other such that the streamer is oriented in the generally horizontal direction and at a second distance from each other such that the streamer is oriented in the generally vertical direction. The first distance is greater than the second distance.

One or more implementations of various techniques for a seismic data acquisition using water vehicles will now be described in more detail with reference to FIGS. 1-9 and in the following paragraphs.

Seismic Acquisition System

Figure 1:
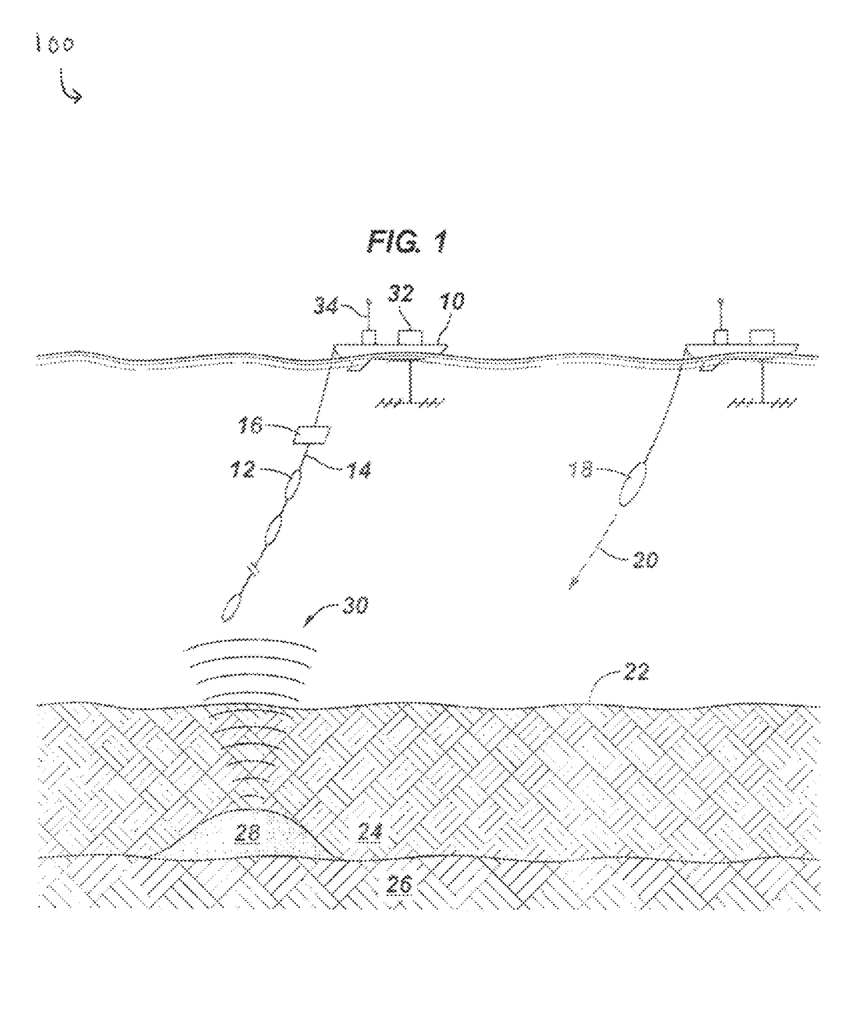
FIG. 1 illustrates a schematic diagram of a marine-based seismic acquisition system in accordance with implementations of various techniques described herein.

FIG. 1 illustrates a schematic diagram of a marine-based seismic acquisition system 100 in accordance with implementations of various techniques described herein. The system 100 may include one or more water vehicles 10, which may be adapted to descend through a water column or may be adapted for movement on a sea surface via a thrust or propulsion mechanism. In one implementation, the water vehicle 10 may be unmanned. For example, the unmanned water vehicle 10 may take the form of an autonomously operating vehicle (AOV) or a remotely operating vehicle (ROV) maneuvering on the sea surface, such as a wave glider or a hybrid water vehicle. The wave glider may be configured to harness wave energy to impart motion to the wave glider, such as the wave glider described in U.S. Pat. No. 7,371,136 entitled WAVE POWER, which is incorporated herein by reference. The hybrid water vehicle may be configured to combine mechanical propulsion methods with energy harvesting principles, such as the energy harvesting principles used by wave gliders. In other implementations, the water vehicle 10 may take the form of a diving wave glider, a submarine water vehicle, a sail buoy, or any other implementation known to those skilled in the art.

The water vehicle 10 may be used for seismic surveying and may include one or more sensors 12. The sensors 12 may be disposed on one or more streamers 14 coupled to the water vehicle 10, where the streamer 14 may descend in a generally vertical direction from the water vehicle 10 into the water column. In one implementation, the streamer 14 may descend 15 meters below the sea surface.

The seismic sensors 12 may be pressure sensors, particle motion sensors, or multi-component seismic sensors. For the case of multi-component seismic sensors, the seismic sensors 12 are capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components) of a particle velocity and one or more components of a particle acceleration.

Multi-component seismic sensors may include one or more geophones, hydrophones, particle displacement sensors, optical sensors, particle velocity sensors, accelerometers, pressure gradient sensors, or combinations thereof. For example, a particular multi-component seismic sensor may include three orthogonally-aligned accelerometers (e.g., a three-component micro electro-mechanical system (MEMS) accelerometer) to measure three corresponding orthogonal components of particle velocity and/or acceleration near the seismic sensor. In such implementations, the MEMS-based sensor may be a capacitive MEMS-based sensor of the type described in commonly assigned co-pending U.S. patent application Ser. No. 12/268,064, now U.S. Pat. No. 8,104,346 which is incorporated herein by reference. In some implementations, a hydrophone for measuring pressure may also be used with the three-component MEMS described herein. It should be noted that not all three axis need to be used, and that two orthogonally-aligned sensors can serve most purposes.

The multi-component seismic sensor may be implemented as a single device or as a plurality of devices. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The water vehicle 10 may be deployed to a survey area for seismic surveying. Where the water vehicle 10 takes the form of an AOV, the water vehicle 10 may be deployed to a survey area specified on a navigation map, and the water vehicle 10 may automatically make corrections if the water vehicle 10 veers off-course. Where the water vehicle 10 takes the form of a ROV, the water vehicle 10 may be deployed to a survey area using remote operation of the water vehicle's rudder.

After deploying the water vehicle 10 to the survey area, a seismic source 18 may be actuated to generate acoustic waves 20 that propagate through an ocean bottom surface 22 and into strata 24, 26 beneath the ocean bottom surface. The seismic source 18 may be located on another water vehicle 10, as shown in FIG. 1, or more conventional source deployments may be used, such as the use of dedicated source vessels. The seismic source 18 may be a conventional air gun, marine vibrator, or non-traditional environmentally friendly source. The seismic source may also include drilling induced acoustic pressure waves, passive seismic noise, or production induced acoustic pressure waves, such as those which may result from water or gas injections, or combinations thereof.

The acoustic signals 20 may be reflected from various subterranean geological formations, such as formation 28 depicted in FIG. 1. The incident acoustic signals 20 produce corresponding reflected acoustic signals, or pressure waves 30, which are sensed by the seismic sensors 12. In one implementation, the water vehicle 10 may record seismic data from over one hundred seismic sensors.

The seismic sensors 12 generate signals called "traces," which indicate the acquired measurements of the pressure wavefield and particle motion if the sensors include particle motion sensors. The traces are recorded and may be passed to a data acquisition system 32 disposed on the water vehicle 10. The data acquisition system 32 may include a digitizer, a computer system, and a storage system for storing seismic data acquired during the survey. The storage system may include memory, such as in the form of a hard disk drive. In one implementation, the seismic data may be recorded continuously over days or months at a time. In another implementation, the seismic data may be recorded intermittently, such as after each detonation of the seismic source 18.

The water vehicle 10 may further include an onboard communication unit 34, which may communicate with a base station located onshore or at sea, such as on a rig or vessel. The communication unit 34 may be used to transmit water vehicle position, quality control parameters, time information, and seismic data. The communication unit 34 may also send or receive commands particular to the seismic survey. The water vehicle 10 may also be powered by batteries, which may be recharged by solar panels disposed on the top of the water vehicle 10.

Recording Seismic Data

As mentioned previously and as illustrated in FIG. 1, the streamer 14 may descend in a generally vertical direction from the water vehicle 10 into the water column. The length of the streamer 14 may vary from less than one meter to over one kilometer. Further, fairings 16 may be employed to reduce cross-flow noise due to currents and drag forces. Accelerometers (not shown) capable of measuring the gravity vector may be used to measure the tilt of the streamer 14 relative to the vertical.

In one implementation, the streamer 14 may be much thinner than conventional towed streamers, thus facilitating ease of handling by the water vehicle 10. For example, the streamer 14 may have a diameter of one half of one inch. Further, the streamer 14 may be formed of fiber optic cables and/or cables with fiber optic sensors may be used, thus resulting in a lighter and thinner streamer relative to conventional towed streamers.

After deploying the water vehicle 10 to the survey area, the water vehicle 10 may maintain a stationary position while recording seismic data via the generally vertical streamer 14. The water vehicle 10 may also drift with currents through the survey area while recording seismic data via the generally vertical streamer 14. While drifting with the currents, the water vehicle 10 may not engage a thrust or propulsion mechanism to avoid drag forces and reduce cross-flow over the generally vertical streamer 14.

In the event that the water vehicle 10 drifts to outside of the survey area, the water vehicle 10 may orient the streamer 14 away from the generally vertical direction using implementations described in later sections. For example, the water vehicle 10 may orient the streamer 14 to a generally horizontal direction within the water column using a buoyancy compensation mechanism, an underwater device, or another wave glider. The water vehicle 10 may also orient streamer 14 away from the generally vertical direction by winding the streamer 14 around a reel mechanism.

In one implementation, the water vehicle 10 may cease recording seismic data while the streamer 14 is oriented away from the generally vertical direction. Upon orienting the streamer 14 away from the generally vertical direction, the water vehicle 10 may tow the streamer 14 using its thrust or propulsion mechanism back to the survey area. By towing the streamer 14 when it is oriented away from the generally vertical direction, the water vehicle 10 may avoid drag forces and reduce cross-flow over the streamer 14.

After reaching the survey area, the water vehicle 10 may use the implementations described in later sections to again orient the streamer 14 in the generally vertical direction and record seismic data. As mentioned above, the water vehicle 10 may then maintain a stationary position or drift with the currents through the survey area while recording seismic data, and orient and tow the streamer 14 again if the water vehicle 10 drifts outside of the survey area.

Streamer Orientation

FIGS. 2-9 illustrate various implementations for orienting a seismic streamer coupled to a water vehicle in accordance with various techniques described herein.

Buoyancy Compensation Mechanism

Figure 2:
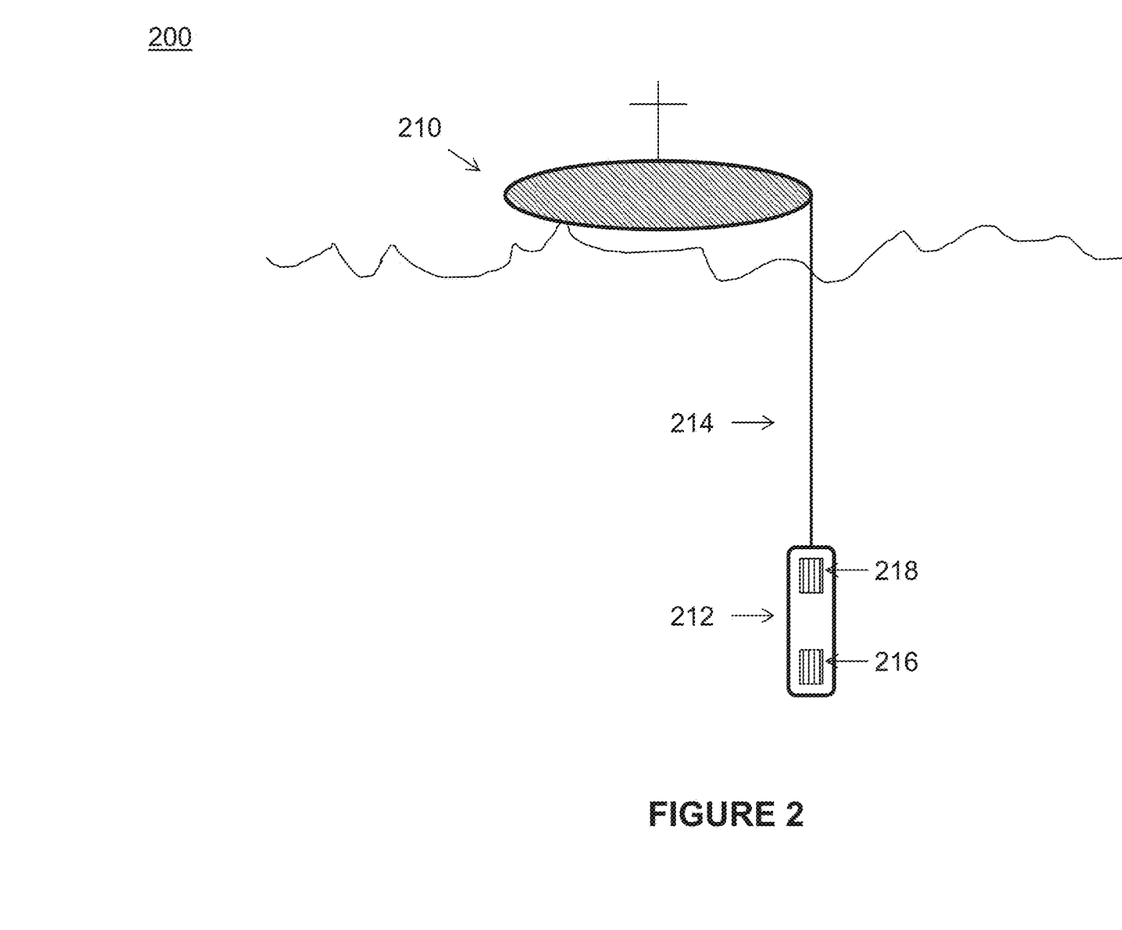
FIGS. 2 and 3 illustrate a schematic diagram of a marine-based seismic acquisition system using a buoyancy compensation mechanism in accordance with implementations of various techniques described herein.
Figure 3:
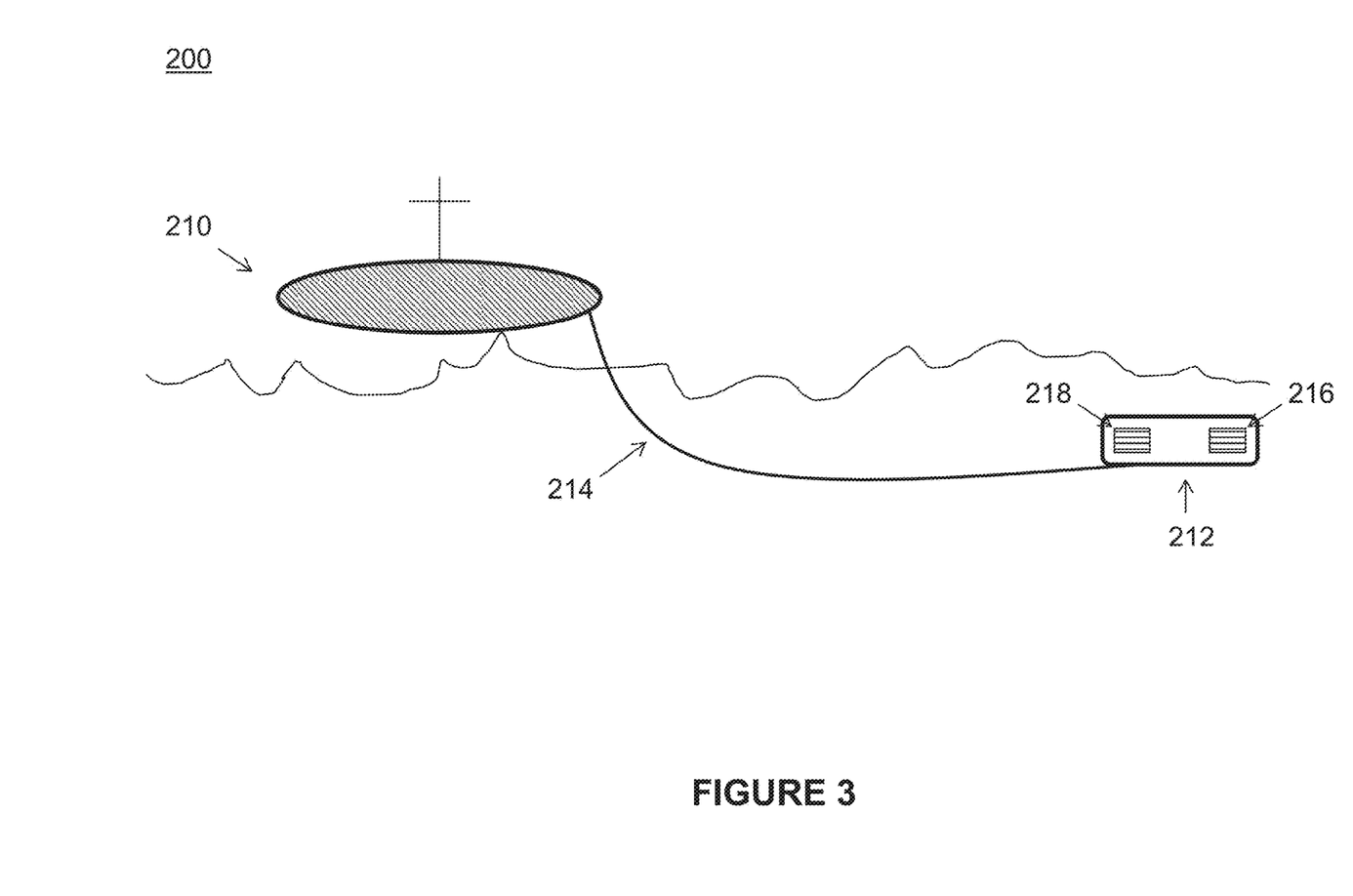

FIGS. 2 and 3 illustrate a schematic diagram of a marine-based seismic acquisition system 200 using a buoyancy compensation mechanism in accordance with implementations of various techniques described herein. In one implementation, the system 200 may include one or more water vehicles 210 having a buoyancy compensation mechanism 212. The buoyancy compensation mechanism 212 may be disposed on one or more streamers 214 coupled to the water vehicle 210. In another implementation, the buoyancy compensation mechanism 212 may be disposed at an end of the streamer 214 farthest from the water vehicle 210. It should be understood that the water vehicle 210 is similar to water vehicle 10 and that the streamer 214 is similar to streamer 14.

In operation, the buoyancy compensation mechanism 212 may adjust its buoyancy to orient the streamer 214 from a generally vertical direction to a generally horizontal direction, and vice versa, through a water column. For example, to orient the streamer 214 in the generally horizontal direction, as illustrated in FIG. 3, the buoyancy compensation mechanism 212 may increase its buoyancy. Further, to orient the streamer 214 in the generally vertical direction, as illustrated in FIG. 2, the buoyancy compensation mechanism 212 may decrease its buoyancy. In one implementation, after decreasing its buoyancy, the buoyancy compensation mechanism 212 may use its weight to ballast the streamer 214 in the generally vertical direction.

To facilitate adjusting its buoyancy, the buoyancy compensation mechanism 212 may include a gas container 216 and a buoyancy bag 218 coupled to the gas container 216 via a valve connection (not shown). The gas container 216 may include a compressed gas and may be configured to transfer the compressed gas to the buoyancy bag 218 via the valve connection. In order to increase the buoyancy of the buoyancy compensation mechanism 212, the gas container 216 may release the compressed gas to the buoyancy bag 218 via the valve connection. The increase in buoyancy may raise the streamer 214 such that the streamer may be oriented in the generally horizontal direction through the water column, as shown in FIG. 3.

To decrease the buoyancy of the buoyancy compensation mechanism 212, the buoyancy bag 218 may release the compressed gas through a release valve (not shown) coupled to the buoyancy bag. The compressed gas may be released through the release valve to the water column or to a reservoir housed within the buoyancy compensation mechanism 212. The decrease in buoyancy may lower the streamer 214 such that the streamer may be oriented in the generally vertical direction through the water column. In one implementation, the gas container 216 may use its weight to ballast the streamer 214 in the generally vertical direction. In another implementation, the valve connection and the release valve may be controlled remotely by the water vehicle 210 through a wireless communication device or through a wired communications line running through the streamer 214.

Reel Mechanism

Figure 4:
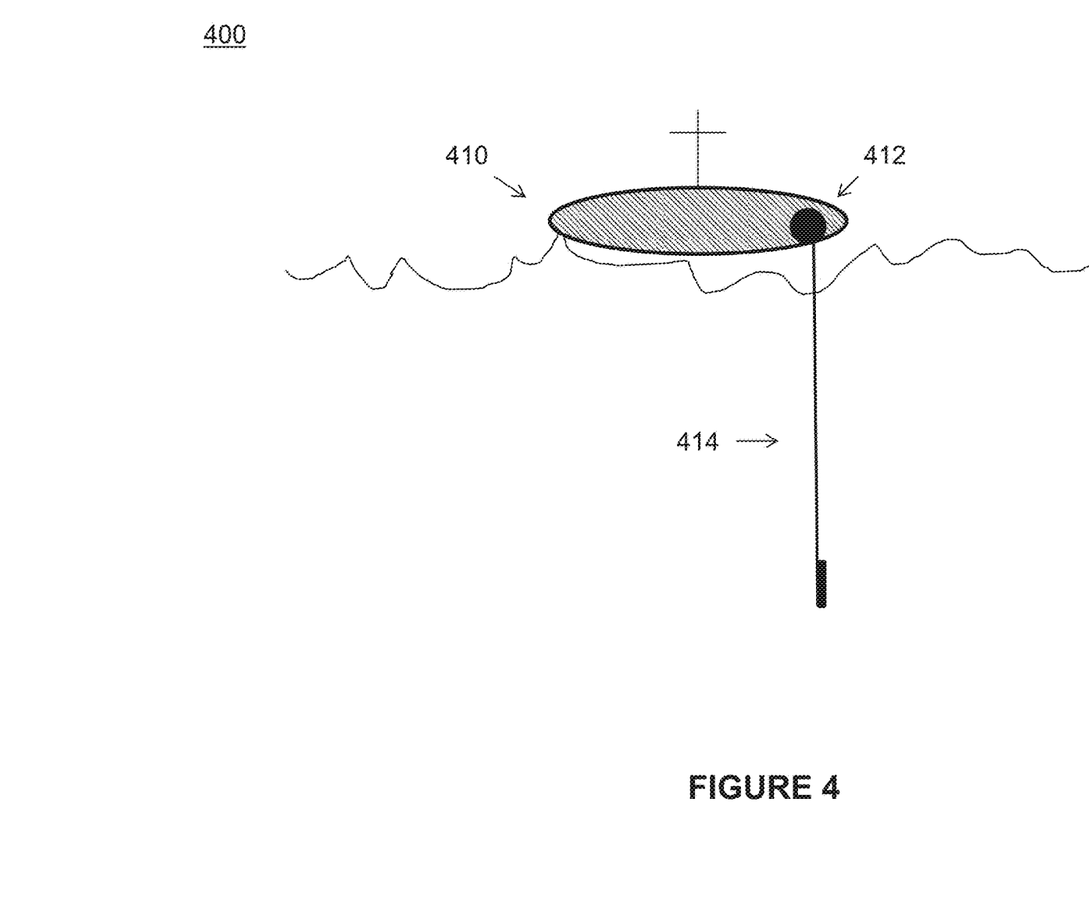
FIGS. 4 and 5 illustrate a schematic diagram of a marine-based seismic acquisition system using a reel mechanism in accordance with implementations of various techniques described herein.
Figure 5:
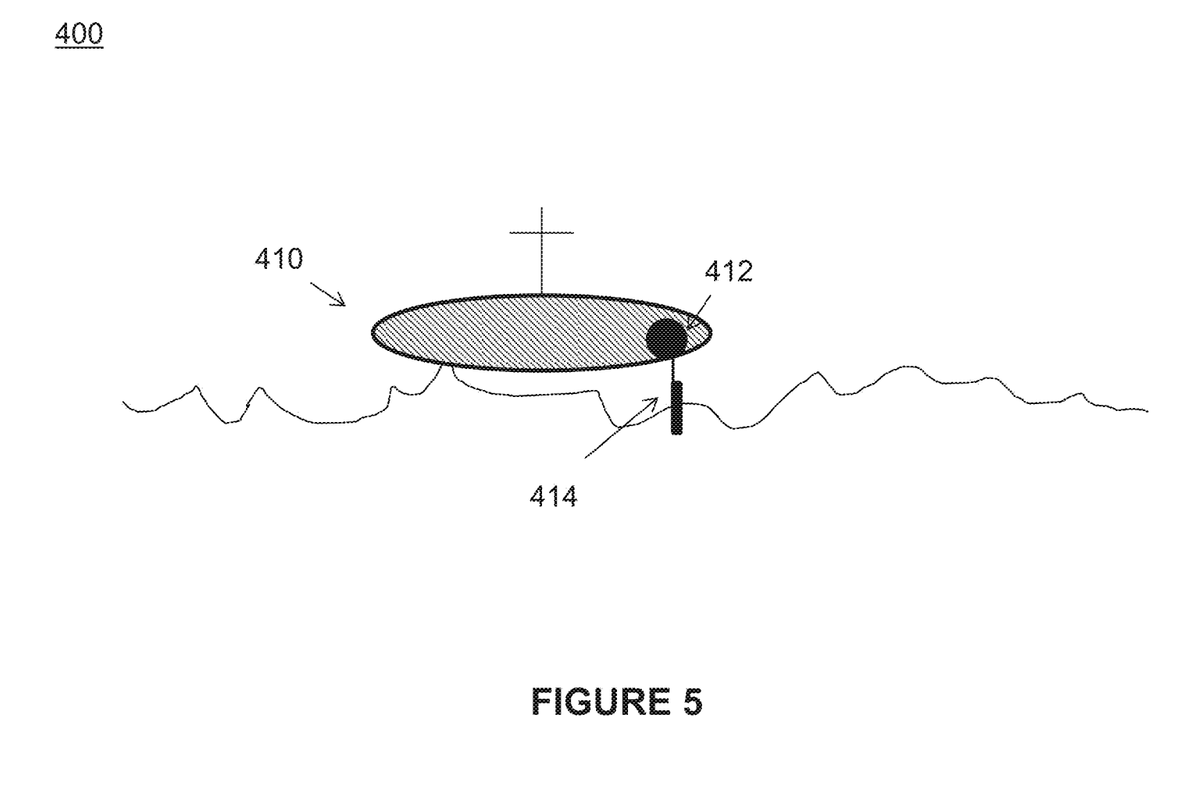

FIGS. 4 and 5 illustrate a schematic diagram of a marine-based seismic acquisition system 400 using a reel mechanism in accordance with implementations of various techniques described herein. The system 400 may include one or more water vehicles 410 having one or more reel mechanisms 412. The reel mechanism 412 may be stored on the water vehicle 410 or may be attached externally to the water vehicle 410 such that it may be towed by the water vehicle 410. One or more streamers 414 may be coupled to the one or more reel mechanisms 412, such that the streamer 414 may be wound onto the reel mechanism 412. It should be understood that the water vehicle 410 is similar to water vehicle 10 and that the streamer 414 is similar to streamer 14.

In one implementation, the streamer 414 may be much thinner than conventional towed streamers, allowing for ease of handling by the reel mechanism 412. For example, the streamer 414 may have a diameter of one half of one inch. Further, the streamer 414 may be composed of fiber optic cables or may include cables with fiber optic sensors, thereby resulting in a lighter and thinner streamer relative to conventional towed streamers. The use of a thinner streamer relative to conventional towed streamers may allow for the use of a smaller reel mechanism 412 than needed for conventional towed streamers.

The reel mechanism 412 may be used to deploy and store the streamer 414. When the water vehicle 410 is located inside the survey area, the reel mechanism 412 may deploy the streamer 414 such that the streamer 414 may be oriented in a generally vertical direction through a water column, as illustrated in FIG. 4. The reel mechanism 412 may deploy streamer 414 using a spring device, a tensioning device, or a combination of these or other implementations known to those skilled in the art. In one implementation, a ballast weight coupled to the streamer 414 may be used in conjunction with the reel mechanism 412 to orient the streamer 414 in the generally vertical direction.

Further, in the event that the water vehicle 410 is located outside of the survey area, the reel mechanism 412 may store the streamer 414 by winding the streamer 414 around the reel mechanism 412, as illustrated in FIG. 5. The reel mechanism 412 may wind the streamer 414 using the spring device, the tensioning device, or the combination of these or other implementations known to those skilled in the art. In one implementation, the water vehicle 410 may control the deploying and storing of the streamer 414 through a wireless or a wired communications link with the reel mechanism 412.

Underwater Device

Figure 6:
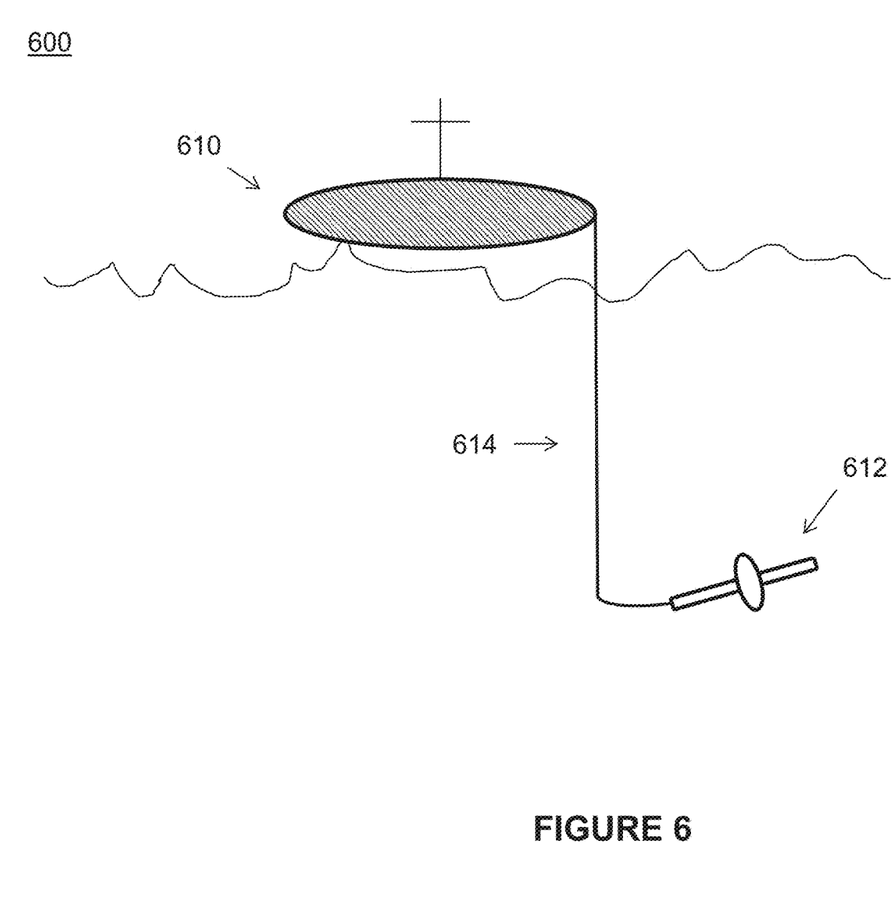
FIGS. 6 and 7 illustrate a schematic diagram of a marine-based seismic acquisition system using an underwater device in accordance with implementations of various techniques described herein.
Figure 7:
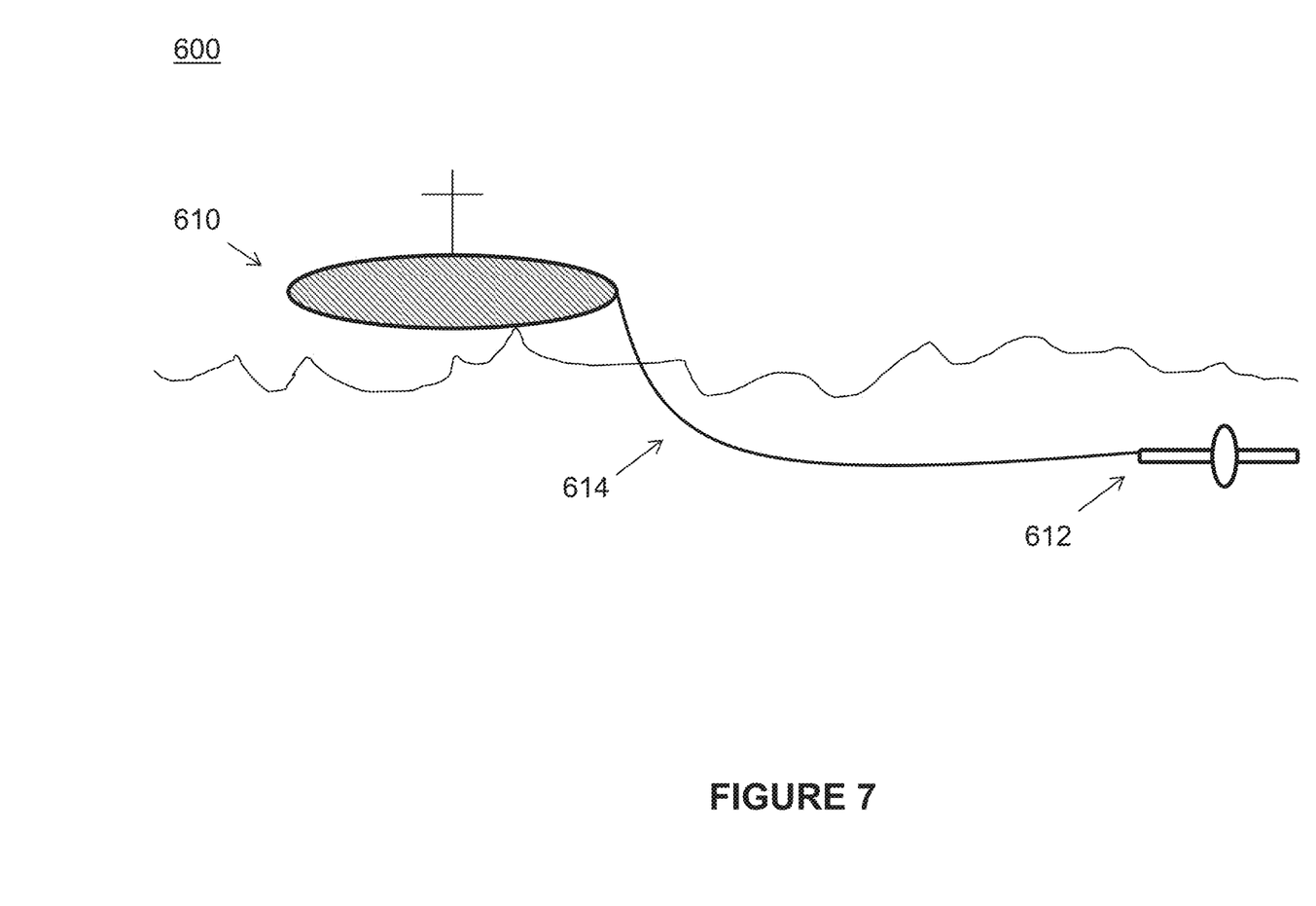

FIGS. 6 and 7 illustrate a schematic diagram of a marine-based seismic acquisition system 600 using an underwater device in accordance with implementations of various techniques described herein. In one implementation, the system 600 may include one or more water vehicles 610 coupled to one or more streamers 614. It should be understood that the water vehicle 610 is similar to water vehicle 10 and that the streamer 614 is similar to streamer 14. One or more underwater devices 612 may be coupled to the streamer 614. In some implementations, the underwater device 612 may be coupled to the streamer 614 along a body of the streamer 614. In other implementations, the underwater device 612 may be coupled to an end of the streamer 614 farthest from the water vehicle, as illustrated in FIGS. 6 and 7.

In one implementation, the underwater device 612 may take the form of an autonomous underwater vehicle (AUV) such as an underwater glider. Examples of underwater gliders known to those skilled in the art may include the "Seaglider" developed by the University of Washington, the "Spray" developed by the Scripps Institution of Oceanography, or the "Slocum Battery" or the "Slocum Thermal" developed by the Webb Research Corporation. These underwater gliders may use buoyancy propulsion or a propeller thrust to maneuver vertically through the water column. The underwater gliders may also use electric power, such as batteries, or may use thermal power by harvesting energy from the ocean's temperature gradient.

In another implementation, the underwater device 612 may take the form of an AUV such as a self-propelled underwater vehicle described in commonly assigned U.S. patent application Ser. No. 12/880,445, now U.S. Application Publication 2011/0266086, entitled "SEISMIC DATA ACQUISITION USING SELF-PROPELLED UNDERWATER VEHICLES," which is incorporated herein by reference. In further implementations, the underwater device 612 may take the form of a submarine water vehicle, a diving wave glider, a self-propelled bird, a hybrid water vehicle, or any other implementation known to those skilled in the art.

In operation, the underwater device 612 may be configured to maneuver within a water column such that it may orient the streamer 614 from a generally vertical direction to a generally horizontal direction, and vice versa. The underwater device 612 may use its power to descend vertically in the water column, thus orienting the streamer 614 into the generally vertical direction, as illustrated in FIG. 6. The underwater device 612 may also use its weight to ballast the streamer 614 in the generally vertical direction. Further, the underwater device 612 may use its power to ascend vertically in the water column, thus orienting the streamer into the generally horizontal direction, as illustrated in FIG. 7. In one implementation, the water vehicle 610 may control the ascent and descent of the underwater device 612 through a wireless or a wired communications link with the underwater device 612.

In another implementation, upon orienting the streamer 614 into the generally horizontal direction, the underwater device 612 may be configured to tow the streamer 614 in conjunction with the water vehicle 610. For example, the underwater device 612 may use its thrust or propulsion mechanism to tow the streamer 614 in conjunction with the water vehicle 610 until reaching a survey area. In yet another implementation, upon orienting the streamer 614 into the generally horizontal direction, the water vehicle 610 may be configured to tow both the streamer 614 and the underwater device 612.

Dual Wave Gliders

Figure 8:
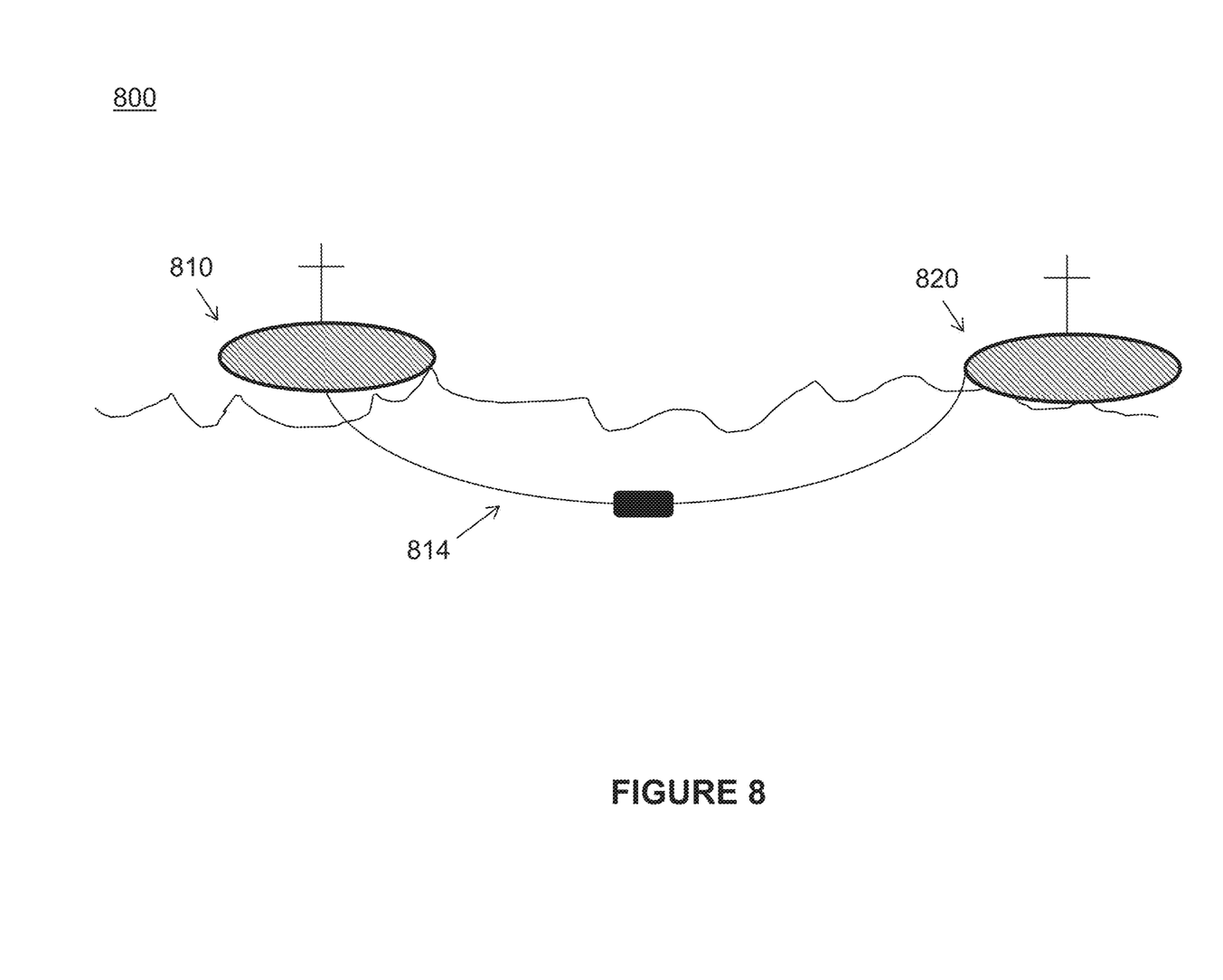
FIGS. 8 and 9 illustrate a schematic diagram of a marine-based seismic acquisition system using dual wave gliders in accordance with implementations of various techniques described herein.
Figure 9:
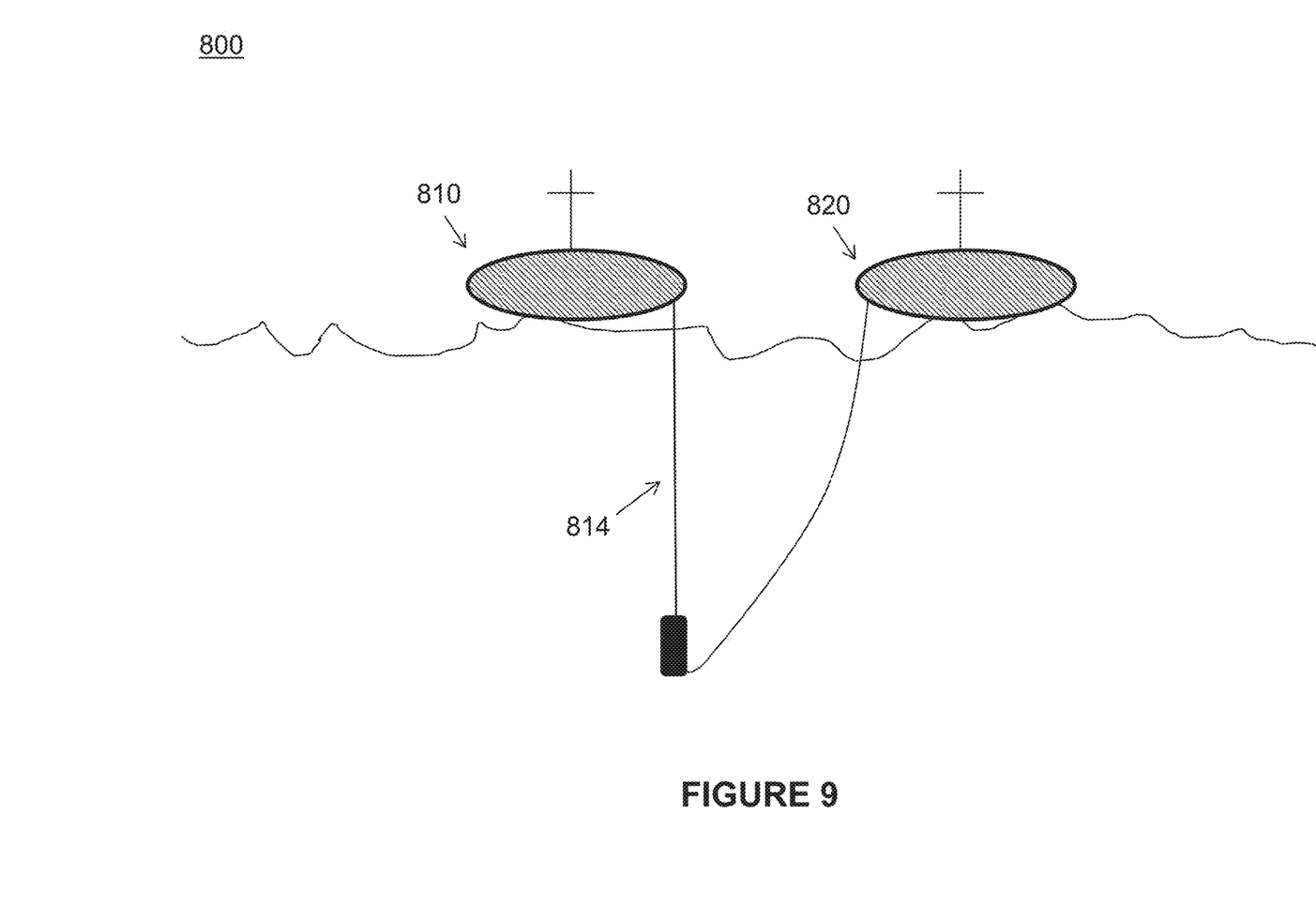

FIGS. 8 and 9 illustrate a schematic diagram of a marine-based seismic acquisition system 800 using dual wave gliders in accordance with implementations of various techniques described herein. In one implementation, the system 800 may include a first water vehicle 810 coupled to a streamer 814. The first water vehicle 810 may be coupled to a first portion of the streamer 814, e.g., a first end of the streamer 814. The system 800 may also include a second water vehicle 820 coupled to the streamer 814. The second water vehicle 820 may be coupled to a second portion of the streamer 814, such as a second end of the streamer 814. It should be understood that the water vehicles 810 and 820 are similar to water vehicle 10 and that the streamer 814 is similar to streamer 14. The first water vehicle 810 and the second water vehicle 820 may communicate with each other via a wireless or a wired communications link.

In operation, the first water vehicle 810 and the second water vehicle 820 may be configured to orient the streamer 814 from a generally vertical direction to a generally horizontal direction, and vice versa, through a water column. In one implementation, the first water vehicle 810 and the second water vehicle 820 may be positioned at a distance from each other such that the streamer 814 is oriented in the generally horizontal direction, as illustrated in FIG. 8. In such an implementation, the first water vehicle 810, the second water vehicle 820, or both may move in a horizontal direction to increase a distance between the water vehicles 810 and 820 until the streamer 814 is oriented in the generally horizontal direction.

In a further implementation, the first water vehicle 810 and the second water vehicle 820 may be positioned at a distance from each other such that the streamer 814 is oriented in the generally vertical direction, as illustrated in FIG. 9. In such an implementation, the first water vehicle 810, the second water vehicle 820, or both may move in a horizontal direction to decrease the distance between the water vehicles 810 and 820 until the streamer 814 is oriented in the generally vertical direction. In one implementation, a ballast weight coupled to the streamer 814 may be used to orient the streamer 814 in the generally vertical direction.

Computing System

Figure 10:
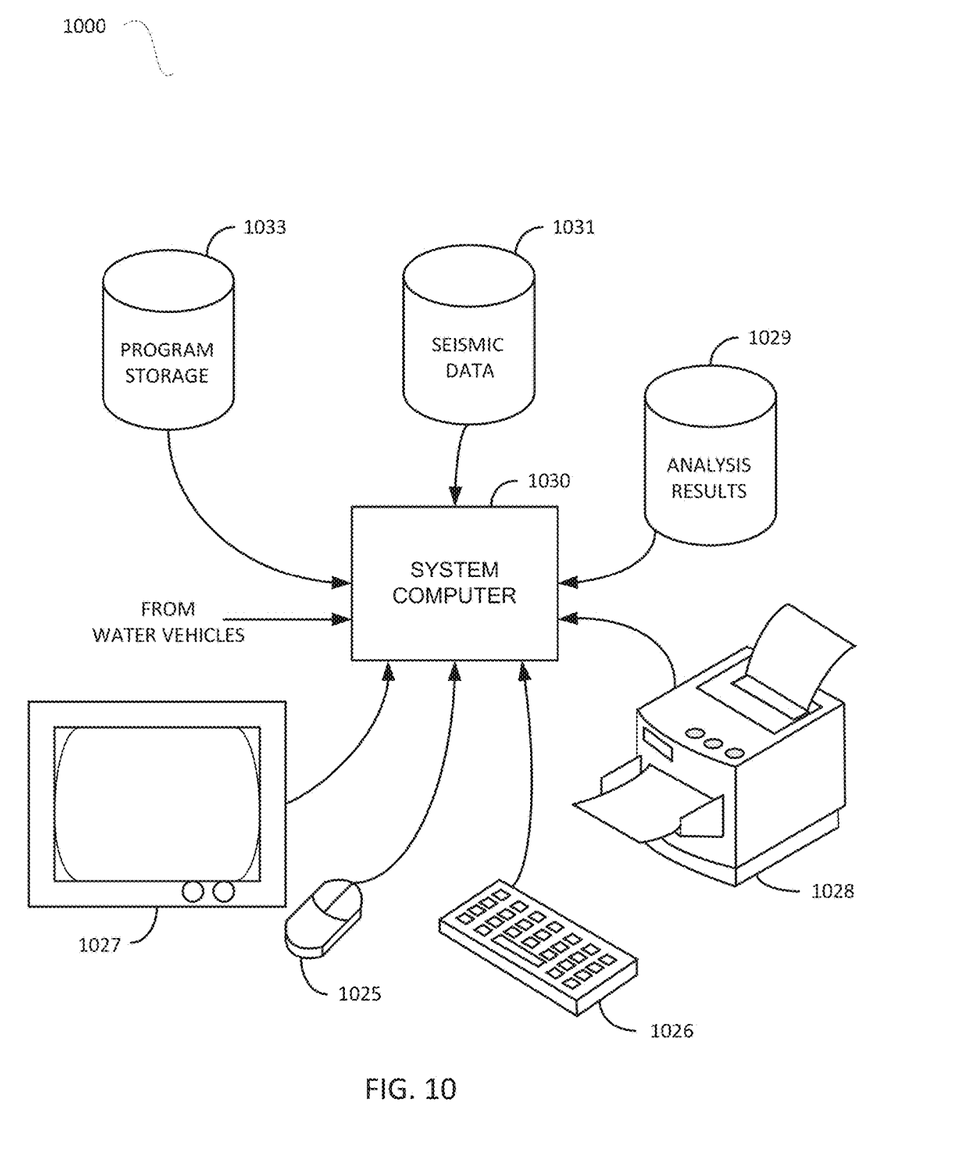
FIG. 10 illustrates an example computing system in accordance with implementations of various techniques described herein.

FIG. 10 illustrates a computing system 1000, into which implementations of various techniques described herein may be implemented. The computing system 1000 (system computer) may include one or more system computers 1030, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 1030 may be in communication with disk storage devices 1029, 1031, and 1033, which may be external hard disk storage devices. It is contemplated that disk storage devices 1029, 1031, and 1033 are conventional hard disk drives, and as such, will be implemented by way of a local area network or by remote access. Of course, while disk storage devices 1029, 1031 and 1033 are illustrated as separate devices, a single disk storage device may be used to store any and all of the program instructions, measurement data and results as desired.

In one implementation, seismic data from the sensors may be stored in disk storage device 1031. The system computer 1030 may retrieve the appropriate data from the disk storage device 1031 to process seismic data according to program instructions that correspond to implementations of various techniques described herein. The program instructions may be written in a computer programming language, such as C++, Java and the like. The program instructions may be stored in a computer-readable medium, such as program disk storage device 1033. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1030. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 1030 may present output primarily onto graphics display 10210, or alternatively via printer 1028. The system computer 1030 may store the results of the methods described above on disk storage 1029, for later use and further analysis. The keyboard 1026 and the pointing device (e.g., a mouse, trackball, or the like) 1025 may be provided with the system computer 1030 to enable interactive operation.

The system computer 1030 may be located at a data center remote from the survey region. The system computer 1030 may be in communication with the receivers (either directly or via a recording unit, not shown), to receive signals indicative of the reflected seismic energy. These signals, after conventional formatting and other initial processing, may be stored by the system computer 1030 as digital data in the disk storage 1031 for subsequent retrieval and processing in the manner described above. In one implementation, these signals and data may be sent to the system computer 1030 directly from sensors, such as geophones, hydrophones and the like. When receiving data directly from the sensors, the system computer 1030 may be described as part of an in-field data processing system. In another implementation, the system computer 1030 may process seismic data already stored in the disk storage 1031. When processing data stored in the disk storage 1031, the system computer 1030 may be described as part of a remote data processing center, separate from data acquisition. The system computer 1030 may be configured to process data as part of the in-field data processing system, the remote data processing system or a combination thereof. While FIG. 10 illustrates the disk storage 1031 as directly connected to the system computer 1030, it is also contemplated that the disk storage device 1031 may be accessible through a local area network or by remote access. Furthermore, while disk storage devices 1029, 1031 are illustrated as separate devices for storing input seismic data and analysis results, the disk storage devices 1029, 1031 may be implemented within a single disk drive (either together with or separately from program disk storage device 1033), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A seismic acquisition system, comprising:
   at least one unmanned water vehicle;
   at least one seismic streamer having a first end and a second end, wherein the first end is coupled to the at least one unmanned water vehicle, and wherein the at least one seismic streamer has one or more seismic sensors coupled thereto for recording data in a survey area; and
   a buoyancy compensation mechanism coupled proximate to an end of the at least one seismic streamer, wherein the second end of the at least one seismic streamer is not attached to a secondary vessel, and wherein:
the buoyancy compensation mechanism is configured to change an orientation of the at least one seismic streamer between a substantially vertical direction and a substantially horizontal direction through a water column;
the buoyancy compensation mechanism is configured to orient the at least one seismic streamer towards the substantially vertical direction using at least the weight of the buoyancy compensation mechanism as a ballast; and
the first end of the at least one seismic streamer is disposed closer to a water surface than the second end of the at least one seismic streamer is oriented in the substantially vertical direction.

2. The system of claim 1, wherein the buoyancy compensation mechanism is configured to decrease its buoyancy to orient the at least one seismic streamer in the substantially vertical direction when the at least one unmanned water vehicle is located in the survey area, and wherein the buoyancy compensation mechanism is configured to increase its buoyancy to orient the at least one seismic streamer in the substantially horizontal direction when the at least one unmanned water vehicle is located outside of the survey area.

3. The system of claim 1, wherein the buoyancy compensation mechanism comprises:
a gas container coupled to the second end of the at least one seismic streamer; and
a buoyancy bag coupled to the gas container, wherein the gas container is configured to transfer a gas to the buoyancy bag.

4. The system of claim 3, wherein the gas container is configured to transfer the gas to the buoyancy bag to orient the at least one seismic streamer in the substantially horizontal direction, and wherein the buoyancy bag is configured to release the gas to the water column or a reservoir housed within the buoyancy compensation mechanism to orient the at least one seismic streamer in the substantially vertical direction.

5. A seismic acquisition system, comprising:
at least one unmanned water vehicle;
at least one seismic streamer having a first end and a second end, wherein the first end is coupled to the at least one unmanned water vehicle, wherein the at least one seismic streamer has one or more seismic sensors coupled thereto for recording seismic data in a survey area;
a ballast weight coupled proximate to the second end of the at least one seismic streamer wherein the second end of the at least one seismic streamer is not attached to a secondary vessel; and
at least one reel mechanism coupled to the at least one unmanned water vehicle for deploying and storing the at least one seismic streamer, wherein:
the at least one unmanned water vehicle is configured to automatically control the at least one reel mechanism to deploy the at least one seismic streamer through a water column if the at least one unmanned water vehicle is positioned within a survey area;
the at least one reel mechanism and the ballast weight in conjunction are configured to orient the at least one seismic streamer towards the substantially vertical direction;
the first end of the at least one seismic streamer is disposed closer to a water surface than the second end when the at least one seismic streamer is oriented in the substantially vertical direction; and
the at least one unmanned water vehicle is configured to automatically control the at least one reel mechanism to wind the at least one seismic streamer around the at least one reel mechanism if the at least one unmanned water vehicle is positioned outside of a survey area.

6. A method of performing a seismic survey, comprising:
deploying at least one seismic streamer in a water column, wherein a first end of the at least one seismic streamer is coupled to at least one unmanned water vehicle for recording seismic data in a survey area, and wherein a ballast weight is coupled proximate to a second end of the at least one seismic streamer, wherein the second end of the at least one seismic streamer is not attached to a secondary vessel; and
automatically changing an orientation of the at least one seismic streamer between a substantially vertical direction and a substantially horizontal direction through the water column based on a position of the at least one unmanned water vehicle with respect to a survey area and the ballast weight.

7. The method of claim 6, wherein changing the orientation of the at least one seismic streamer comprises:
using a buoyancy compensation mechanism that is coupled to the at least one seismic streamer to orient the at least one seismic streamer between the substantially vertical direction and the substantially horizontal direction through the water column;
decreasing a buoyancy of the buoyancy compensation mechanism to orient the at least one seismic streamer in the substantially vertical direction when the at least one unmanned water vehicle is located in the survey area; and
increasing the buoyancy of the buoyancy compensation mechanism to orient the at least one seismic streamer in the substantially horizontal direction when the at least one unmanned water vehicle is located outside of the survey area.

8. The method of claim 6, comprising:
changing the orientation of the at least one seismic streamer between the substantially vertical direction and the substantially horizontal direction through the water column by using at least one underwater device coupled to the at least one seismic streamer.

9. The method of claim 8, wherein changing the orientation of at least the at least one seismic streamer comprises:
orienting the at least one seismic streamer in the substantially vertical direction when the at least one unmanned water vehicle is located in the survey area by descending the at least one underwater device towards a water bottom; and
orienting the at least one seismic streamer in the substantially horizontal direction when the at least one unmanned water vehicle is located outside of the survey area by ascending the at least one underwater device towards a water surface.

10. The method of claim 8, further comprising towing the at least one seismic streamer oriented in the substantially horizontal direction to the survey area using the at least one underwater device in conjunction with the at least one unmanned water vehicle.

11. The method of claim 8, wherein at least one unmanned water vehicle is a first unmanned water vehicle and the underwater device is a second unmanned water vehicle, the method further comprising:

changing the orientation of the seismic streamer between the substantially vertical direction and the substantially horizontal direction through a water column by adjusting a distance between the first unmanned water vehicle and the second unmanned water vehicle.

12. The method of claim 11, wherein changing the orientation of the seismic streamer comprises:
decreasing the distance between the first unmanned water vehicle and the second unmanned water vehicle to orient the seismic streamer in the substantially vertical direction when the first unmanned water vehicle and the second unmanned water vehicle are located in the survey area; and
increasing the distance between the first unmanned water vehicle and the second unmanned water vehicle to orient the seismic streamer in the substantially horizontal direction when the first unmanned water vehicle and the second unmanned water vehicle are located outside of the survey area.

13. The system of claim 5, wherein the first end of the seismic streamer is configured to be disposed closer to a water surface than the second end of the seismic streamer when the seismic streamer is oriented in the substantially vertical direction.

14. The method of claim 6, wherein a first end of the at least one seismic streamer is configured to be disposed closer to a water surface than a second end of the at least one seismic streamer when the at least one seismic streamer is oriented in the substantially vertical direction.

* * * * *